(12) United States Patent
Sherman et al.

(10) Patent No.: US 6,603,957 B1
(45) Date of Patent: Aug. 5, 2003

(54) STATIC AND DYNAMIC PARTNERING SCHEMES FOR SATELLITE CROSS-LINKS

(75) Inventors: John A. Sherman, Tempe, AZ (US); Dennis P. Diekelman, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/540,727

(22) Filed: Mar. 31, 2000

(51) Int. Cl.$^7$ .............................................. H04B 7/185
(52) U.S. Cl. ....................... 455/13.1; 455/13.2; 455/927; 455/12.1
(58) Field of Search ........................... 455/13.1, 13.2, 455/11.1, 12.1, 427, 3.01, 3.02, 98, 3.06; 294/158 R, 176; 370/316, 319; 342/355, 356, 357.06, 357.15, 357.16, 358, 352

(56) References Cited

U.S. PATENT DOCUMENTS

| | | | | |
|---|---|---|---|---|
| 5,579,536 A | | 11/1996 | Stackman et al. | |
| 5,641,134 A | * | 6/1997 | Vatt | 244/158 R |
| 5,678,184 A | * | 10/1997 | Cutler et al. | 455/436 |
| 5,810,297 A | * | 9/1998 | Basuthakur et al. | 244/176 |
| 5,911,389 A | * | 6/1999 | Drake | 244/158 R |
| 5,920,804 A | * | 7/1999 | Armbruster et al. | 455/13.2 |
| 6,219,593 B1 | * | 4/2001 | Kroncke | 701/13 |
| 6,226,493 B1 | * | 5/2001 | Leopold et al. | 455/13.1 |
| 6,249,513 B1 | * | 6/2001 | Malarky | 370/316 |
| 2002/0136191 A1 | * | 9/2002 | Draim et al. | 370/344 |

* cited by examiner

Primary Examiner—William Trost
Assistant Examiner—Congvan Tran

(57) ABSTRACT

The present invention provides a method and apparatus for establishing a partnering scheme having dynamic cross-links between satellites of a satellite communication system that are travelling in different, non-adjacent orbital planes and in different directions. The present invention provides a definitive set of dynamic cross-links for a satellite positioned within a first orbital plane traveling in a first direction, such as an ascending direction, with a satellite positioned in a non-adjacent orbital plane and traveling in a second direction, such as an descending direction.

22 Claims, 10 Drawing Sheets

STATIC AND DYNAMIC PARTNERING SCHEMES FOR SATELLITE CROSS-LINKS

FIELD OF THE INVENTION

This invention relates to satellite communication systems and, in particular, to communication links between non-stationary communication units of a satellite communication system.

BACKGROUND OF THE INVENTION

In a typical satellite communication system, satellites may be required to communicate with other satellites to transfer data from a source node to a destination node. A source node or destination node may, for example, be a ground-based cellular telephone or a satellite within the satellite constellation. Communication between satellites may be performed by transmitting information from a satellite associated with a source node to a satellite associated with the destination node, or another intermediate satellite.

A direct communication link between two satellites is referred to herein as a cross-link. A cross-link is maintained where the communication antennas of both the source and the destination, or intermediate satellite(s), are pointed toward each other and data communication is occurring.

During each orbit, a non-geosynchronous satellite will travel in both an ascending (i.e. northbound) and a descending (i.e. southbound) direction whereby the direction changes as the satellites reach their maximum northern and southern latitudes. Where multiple, parallel orbital planes exist, satellites in a first orbital plane may travel in the same direction as satellites in an adjacent orbital plane, such as in an inclined orbit, or the satellites in the first orbital plane may travel in the opposite direction as satellites in an adjacent orbital plane (e.g., satellites in a first orbital plane are ascending and satellites in an adjacent orbital plane are descending), such as in a polar or an inclined orbit.

Typical satellite communication systems do not provide a method or apparatus for maintaining a cross-link with satellites in an adjacent orbital plane that are travelling in opposite directions. Because of this, a data packet intended for a destination satellite that is travelling in an opposite direction from the source satellite may not be transmitted directly to the destination satellite. Rather, the data packet must be transmitted through intermediate satellites travelling in the same plane, or a parallel orbital plane, until it reaches an intermediate satellite that is travelling in the same direction as the destination satellite. Then, the data packet may be transmitted, potentially through several intermediate satellites, to the destination satellite. However, each intermediate satellite that a data packet must be transferred through increases the amount of time it takes for the data packet to travel from its source to its destination. Therefore, in a communication system that transmits data packets containing voice data, multiple satellite transfers results in a noticeable delay in receipt of a voice signal.

Referring to U.S. Pat. No. 5,579,536, assigned to the same assignee as the subject application, there is disclosed a method and apparatus for establishing links between non-stationary communication units for a satellite constellation comprised of polar orbits, such as the Iridium® communication system manufactured by Motorola, Inc. The subject matter of the '536 patent is incorporated by reference herein. The '536 patent, however, only discloses a method and apparatus for cross-linking satellites between adjacent planes that are travelling in opposite directions and are within a "link boundary corridor". The '536 patent does not address a comprehensive partnering scheme for static or dynamic cross-links that is common to all satellites within the constellation, nor does it provide for the establishment of cross-links between satellites traveling in opposite direction and in non-adjacent orbital planes.

Therefore, what is needed is a method and apparatus for establishing a partnering scheme for a dynamic cross-link between satellites travelling in different directions and that are positioned within non-adjacent orbital planes such as is the case in an inclined orbital plane constellation. Such a partnering scheme with dynamic cross-links would minimize the number of satellite transfers that a data packet must undergo thereby enhancing system performance.

BRIEF DESCRIPTION OF THE DRAWINGS

The invention is pointed out with particularity in the appended claims. However, more complete understanding of the present invention may be derived by referring to the detailed description and claims when considered in connection with the figures, wherein:

DETAILED DESCRIPTION OF THE DRAWINGS

Figure 1:
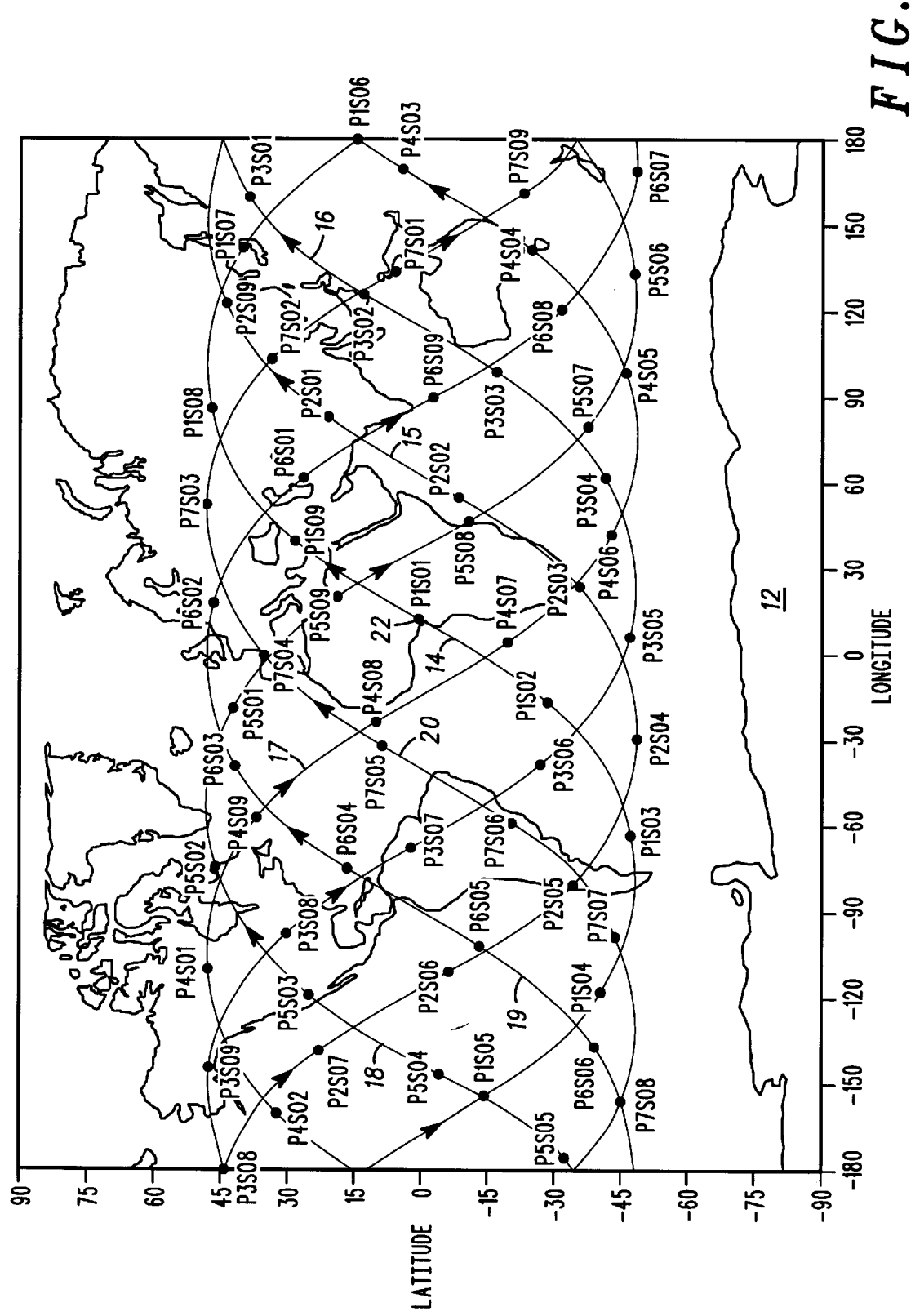
FIG. 1 illustrates a simplified diagram of a seven plane satellite constellation each plane having nine satellites therein in accordance with the present invention.

Generally, the present invention provides a method and apparatus for establishing a constant/static partnering scheme whereby each satellite in the constellation has common predetermined cross-links with satellites in the same, adjacent, or non-adjacent planes. Further, the present invention also establishes a dynamic partnering scheme whereby each satellite in the constellation may have a common predetermined dynamic cross-links with satellites in non-adjacent planes. To that end, the present invention provides a definitive static partnering scheme that is common to all satellites in the constellation. Further, the present invention provides a definitive dynamic partnering that is also common to all satellites in the constellation. Referring to FIG. 1, a simplified diagram of satellite constellation 12 whereby constellation 12 consists of seven orbital planes 14–20 and whereby each orbital plane includes nine satellites. The designation used herein to represent a first satellite within a first orbital plane, as identified by reference number 22, is P1S01. Likewise, the ninth satellite within the sixth orbital plane, for example, is represented by P6S09, and so on. It is understood that although a 7×9 constellation is shown in FIG. 1, the present invention is applicable to any type or size of orbital constellation.

Figure 2:
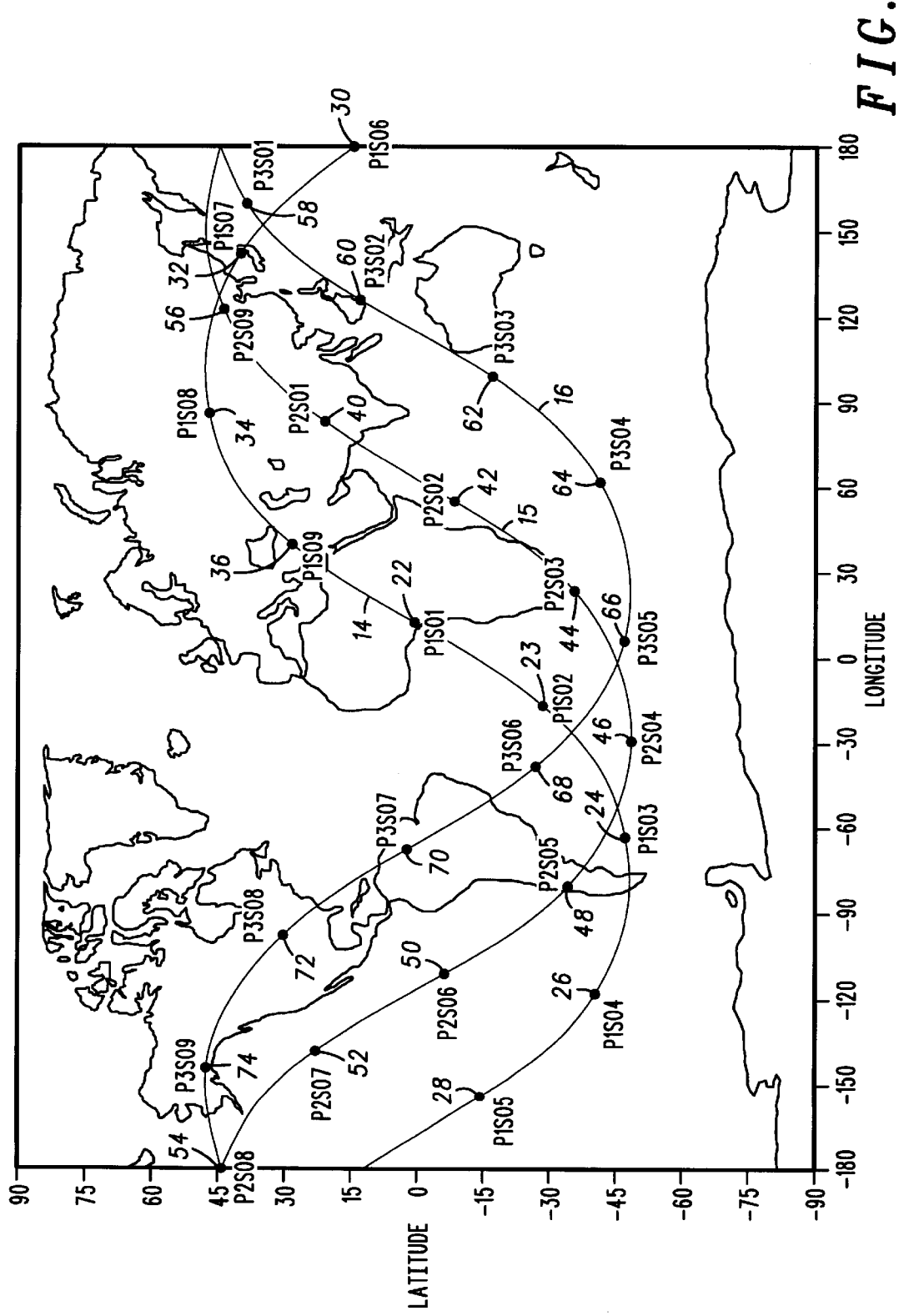
FIG. 2 illustrates only three parallel planes of the satellite constellation of FIG. 1 for purposes of simplicity.

Referring now to FIG. 2, three parallel planes of the satellite constellation of FIG. 1 is shown for purposes of simplicity whereby like components are identified by like reference numbers. In particular, the first three planes, as designated by 14, 15 and 16, are shown each having nine satellites therein as designated by S1–S9. Accordingly, satellite 22 represents a first satellite within a first orbital plane (i.e. P1S01). This satellite is arbitrarily designated as P1S01 based on the fact that it is the first satellite to cross the equator (i.e. 0° latitude) at a particular instant in time. It is understood that other satellites could have been arbitrarily chosen to be satellite P1S01. Satellites following satellite 22 in plane 1 are consecutively numbered S2–S9 as represented by reference numerals 23–36. Likewise, with respect to plane 2, the first satellite that crosses the equator in an ascending direction before P1S01 is designated as satellite 1 in plane 2, as represented by reference number 40, for a positive phase offset with respect to P1S01. Alternately, with respect to plane 2, the first satellite that crosses the equator in an ascending direction after P1S01 may be designated as satellite 1 in plane 2 (P2S01) whereby this alternate numbering arrangement would correspond to a negative phase offset with respect to P1S01. Similarly, satellites following satellite 40 in plane 2 are identified by reference numerals 42–56. Finally, with respect to plane 3, the first satellite that crosses the equator in an ascending direction before P2S01 is designated as satellite 1 in plane 3 (P3S01), as represented by reference number 58, for the positive phase offset with respect to P2S01. Similarly, satellites following satellite 58 in plane 3 are identified by reference numerals 60–74.

Figure 3:
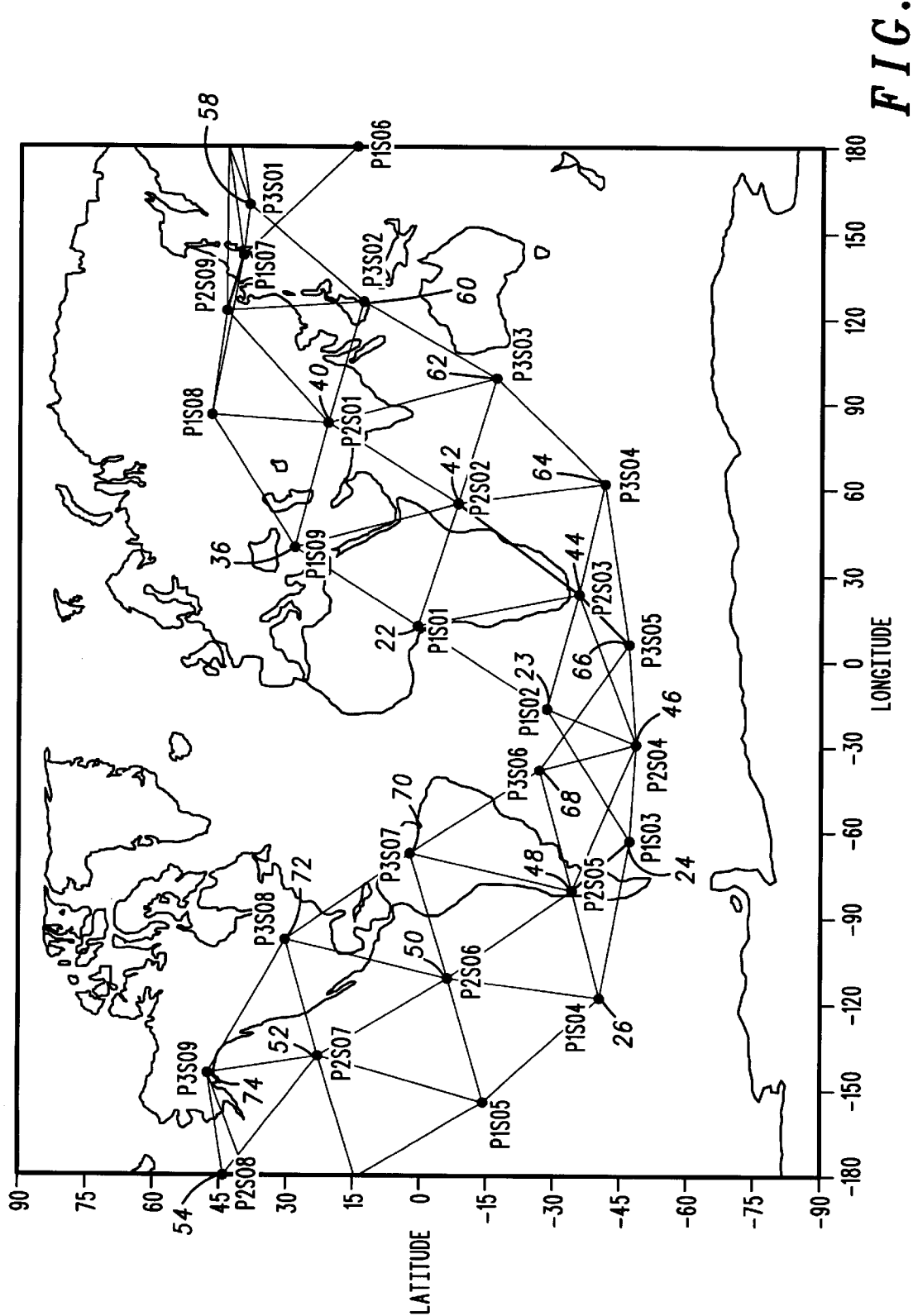
FIG. 3 illustrates the three parallel planes of FIG. 2 having a predetermined 6-satellite cross-link partnering scheme.

Referring now to FIG. 3, the three parallel planes of the satellite constellation of FIG. 2 are shown having a predetermined 6-satellite static cross-link partnering scheme whereby like components to those in FIGS. 1 and 2 are identified by like reference numbers. Referring in particular to satellite 42 (i.e., the second satellite in the second orbital plane, P2S02), satellite 42 represents the cross-linking scheme for each satellite of the constellation and is cross-linked to six different satellites. Satellite 42 is cross-linked with satellites 40 (P2S01) and 44 (P2S03), which are satellites in the same plane as satellite 42, with satellites 62 (P3S03) and 64 (P3S04), which are in adjacent plane 3, and satellites 22 (P1S01) and 36 (P1S09), which are in adjacent plane 1. In general, the static partnering scheme for the Mth satellite in the Nth plane, PNSM, may be represented by Table 1.

TABLE 1

Static Partnering scheme for the Mth satellite in the Nth orbital plane (PNSM).

| SATELLITE | PLANE |
| --- | --- |
| PN S(M + 1) | SAME |
| PN S(M − 1) | SAME |
| P(N + 1) S(M + 1) | CLOCKWISE ADJACENT |
| P(N + 1) S(M + 2) | CLOCKWISE ADJACENT |
| P(N − 1) S(M − 1) | C-CLOCKWISE ADJACENT |
| P(N − 1) S(M + 7) | C-CLOCKWISE ADJACENT |

This scheme for partnering the Mth satellite in the Nth orbital plane is based on the premise that the satellites in each plane wrap around such that in a 9 satellite plane, M+1 for M=9 wraps back to the first satellite (M=1). Likewise, M−1 for M=1 wraps back to the ninth satellite (M=9). Further, a clockwise direction refers to a rightward direction in FIGS. 1–3, while a counter-clockwise direction refers to a leftward direction in FIGS. 1–3.

Figure 4:
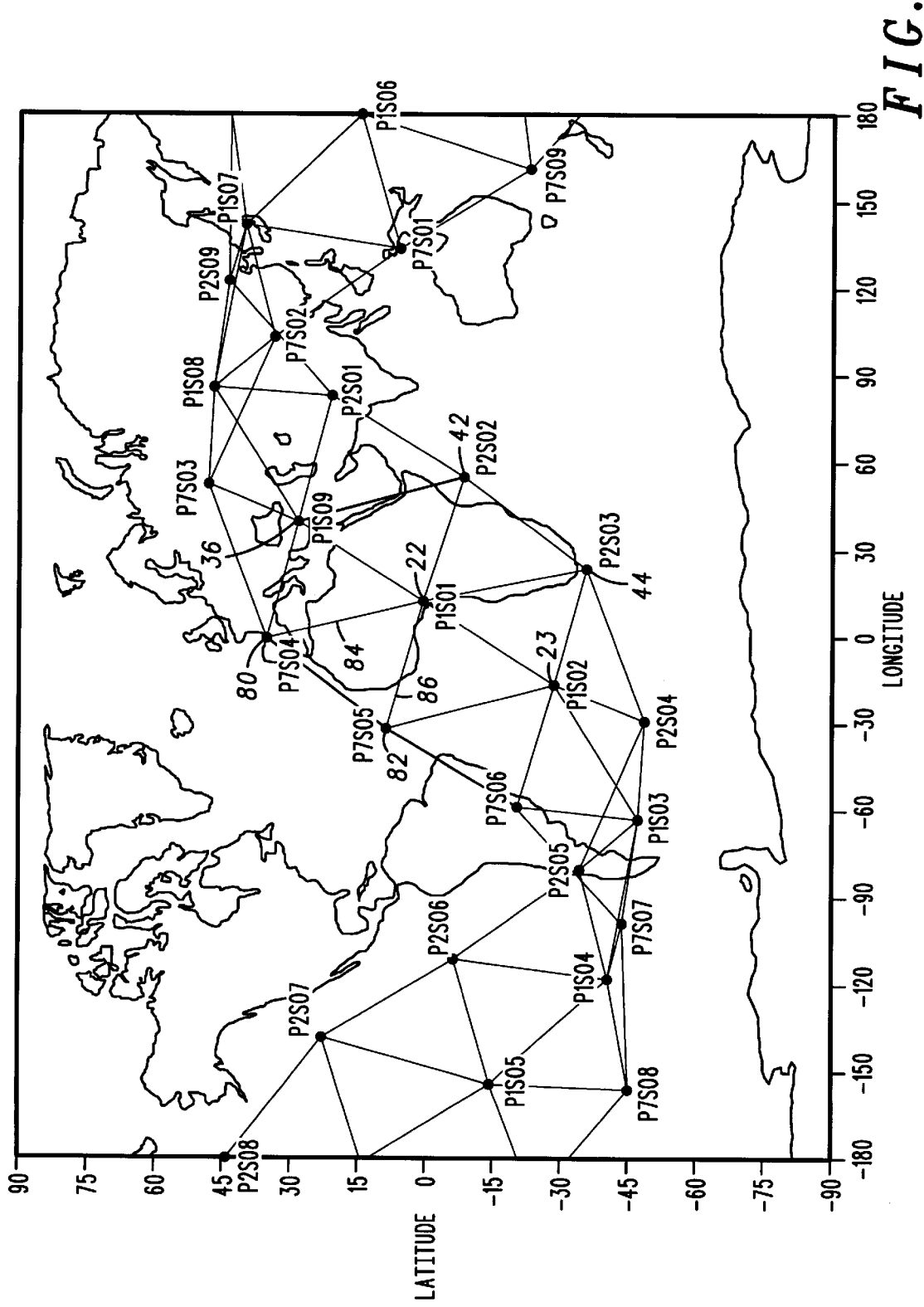
FIG. 4 illustrates the three parallel planes of the satellite constellation of FIG. 2 showing a seam that exists between planes 1 and 7.

This scheme for partnering the Mth satellite in the Nth orbital plane will apply for all links except for those links that are between the "seam" of the constellation, i.e., links between satellites in plane 1 and plane 7, or vice-versa. Referring to FIG. 4, three parallel planes of the satellite constellation of FIG. 2 is shown having a seam that exists between planes 1 and 7. For links across the seam from a satellite in plane 1 to a satellite in plane 7, the partnering scheme set forth in Table 1 must be slightly modified. Referring in particular to satellite 22 (i.e., the first satellite in the first orbital plane, P1S01), satellite 22 represents the cross-linking scheme for each satellite that includes a cross-link across the seam of the constellation. Satellite 22 is cross-linked with satellites 23 (P1S02) and 36 (P1S09), which are satellites in the same plane as satellite 22, with satellites 42 (P2S02) and 44 (P2S03), which are in clockwise adjacent plane 2, and satellites 80 (P7S04) and 82 (P7S05), which are in counter-clockwise adjacent plane 7. For such cross links crossing the seam of the constellation, the static partnering scheme of Table 1 must be modified by the scheme as illustrated in Table 2.

TABLE 2

Static Partnering scheme for the Mth satellite in the first orbital plane (P1SM) with links across the seam to plane 7.

| SATELLITE | PLANE |
| --- | --- |
| PN S(M + 1) | SAME |
| PN S(M − 1) | SAME |
| P(N + 1) S(M + 1) | CLOCKWISE ADJACENT |
| P(N + 1) S(M + 2) | CLOCKWISE ADJACENT |
| P(N − 1) S(M + 3) | C-CLOCKWISE ADJACENT (SEAM) |
| P(N − 1) S(M + 4) | C-CLOCKWISE ADJACENT (SEAM) |

As can be seen from Table 2, the only links that are modified from the scheme of Table 1 are the links that cross the "seam" of the constellation. Thus, only the links 84 and 86 that are between satellites in planes 1 and 7 require modification.

Likewise, for links across the seam from a satellite in plane 7 to a satellite in plane 1, the partnering scheme set forth in Table 1 must be slightly modified. For such cross links crossing the seam of the constellation, the static partnering scheme of Table 1 must be modified by the scheme as illustrated in Table 3.

TABLE 3

Static Partnering scheme for the Mth satellite in the seventh orbital plane (P7SM) with links across the seam to plane 1.

| SATELLITE | PLANE |
| --- | --- |
| PN S(M + 1) | SAME |
| PN S(M − 1) | SAME |
| P(N + 1) S(M + 5) | CLOCKWISE ADJACENT (SEAM) |
| P(N + 1) S(M + 6) | CLOCKWISE ADJACENT (SEAM) |
| P(N − 1) S(M − 1) | C-CLOCKWISE ADJACENT |
| P(N − 1) S(M + 7) | C-CLOCKWISE ADJACENT |

Tables 1, 2 and 3 define the static partnering scheme for any Mth satellite in any Nth plane with respect to the cross-link partner satellites in the same orbital plane or to satellites in adjacent satellite planes. Accordingly, the linking scheme is common to all satellites that exists in the constellation. Therefore, for any given satellite in planes 2–6, Table 1 clearly defines the partners for such satellite. Likewise, for any given satellite in planes 1 or 7, Tables 2 and 3, respectively, define the partners for such satellite. Further, the use of the term "static" implies that these links are typically always present (or at least present most of the time) between the satellites while the use of the term dynamic implies a link that exists for a certain period of time between two satellite, but typically not all the time, or one that changes satellite partners.

The present invention further provides a method and apparatus for establishing a dynamic cross-link partnering scheme for an Mth satellite in an Nth plane with satellites in non-adjacent planes. In particular, the present invention describes a dynamic partnering scheme for a satellite travelling in a first direction with a satellite travelling in a second direction and whereby these two satellites are in non-adjacent orbital planes.

Figure 5:
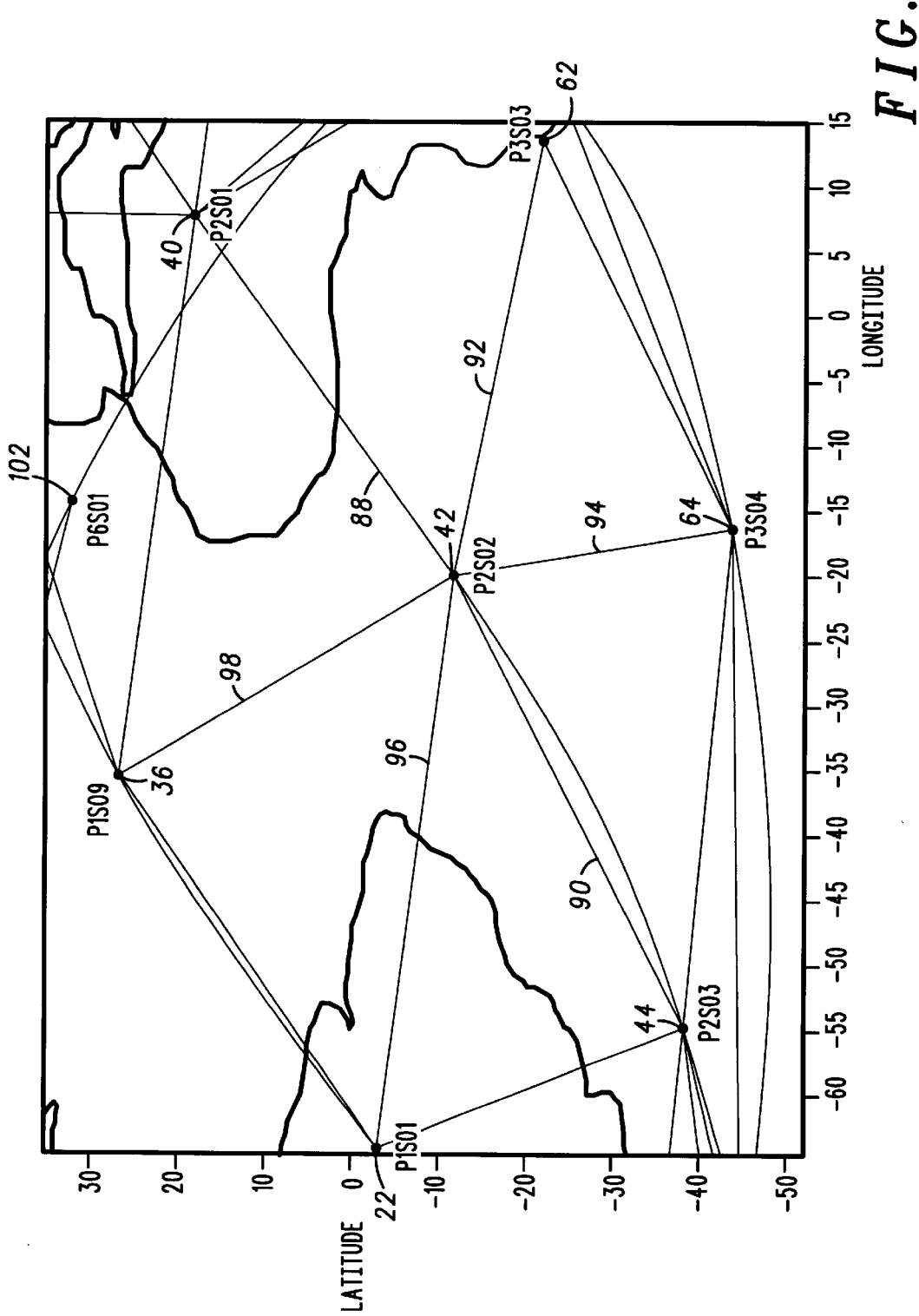
FIGS. 5–10 illustrate pictorial diagrams showing the dynamic partnering scheme of the present invention.

Referring to FIGS. 5–10, pictorial diagrams illustrating the dynamic partnering scheme of the present invention is shown. FIG. 5 shows satellite 42 with static cross-links 88 and 90 to common plane satellites 40 and 44, cross-links 92 and 94 to satellites 62 and 64 of plane 3, and cross-links 96 and 98 to satellites 22 and 36, respectively of plane 1. This partnering scheme for satellite 42 is the static partnering scheme described in Table 1. Satellite 42 is moving in a first direction, for example, in ascending direction, while satellite 102 which represents a first satellite in plane 6 is moving in a second direction, for example, a descending direction. As satellite 42 moves closer to satellite 102, static cross-link 88 will be disconnected while a new dynamic cross-link between satellite 42 and 102 will be established in accordance with the present invention.

Figure 6:
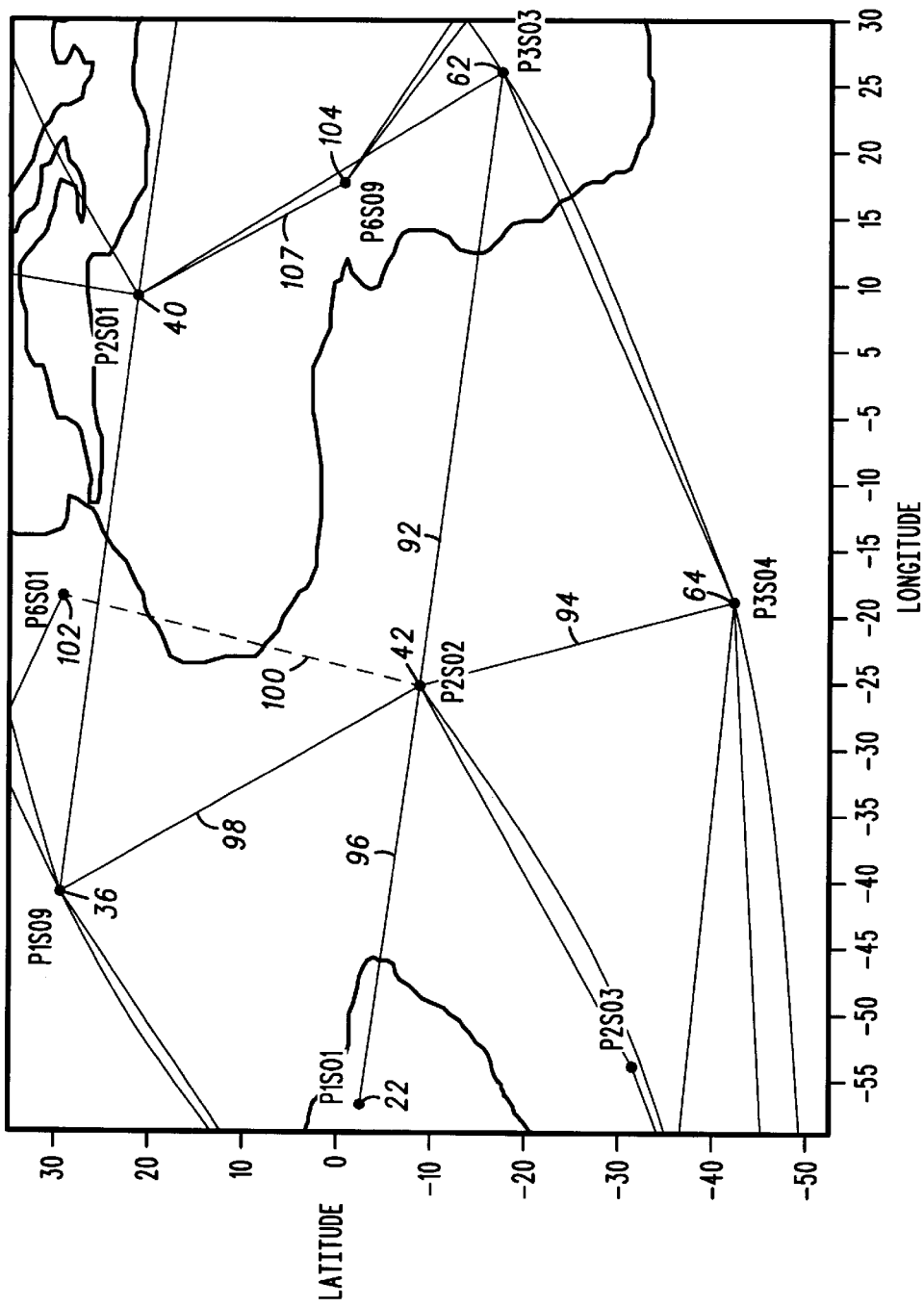

Referring to FIG. 6, cross-link 88 is no longer shown because it has been disconnected, while dynamic cross-link 100 (shown in dotted lines in FIG. 6) is beginning to be acquired. All other static cross-links associated with satellite 42, as defined in Table 1, remain intact. It is worth noting that link 88 does not have to be disconnected if the satellite has a seventh terminal for maintaining the link. The process of acquiring a new link may include the following steps. First, the antenna is repositioned (either mechanically or electrically) to point at the location of the new partner node/satellite. Next, one or both of the partners may direct a test signal at the other partner for purposes of fine alignment and synchronization of the communications link. Finally, once these steps have been accomplished, information may then begin to be transmitted and received between the two new dynamic partners.

Figure 7:
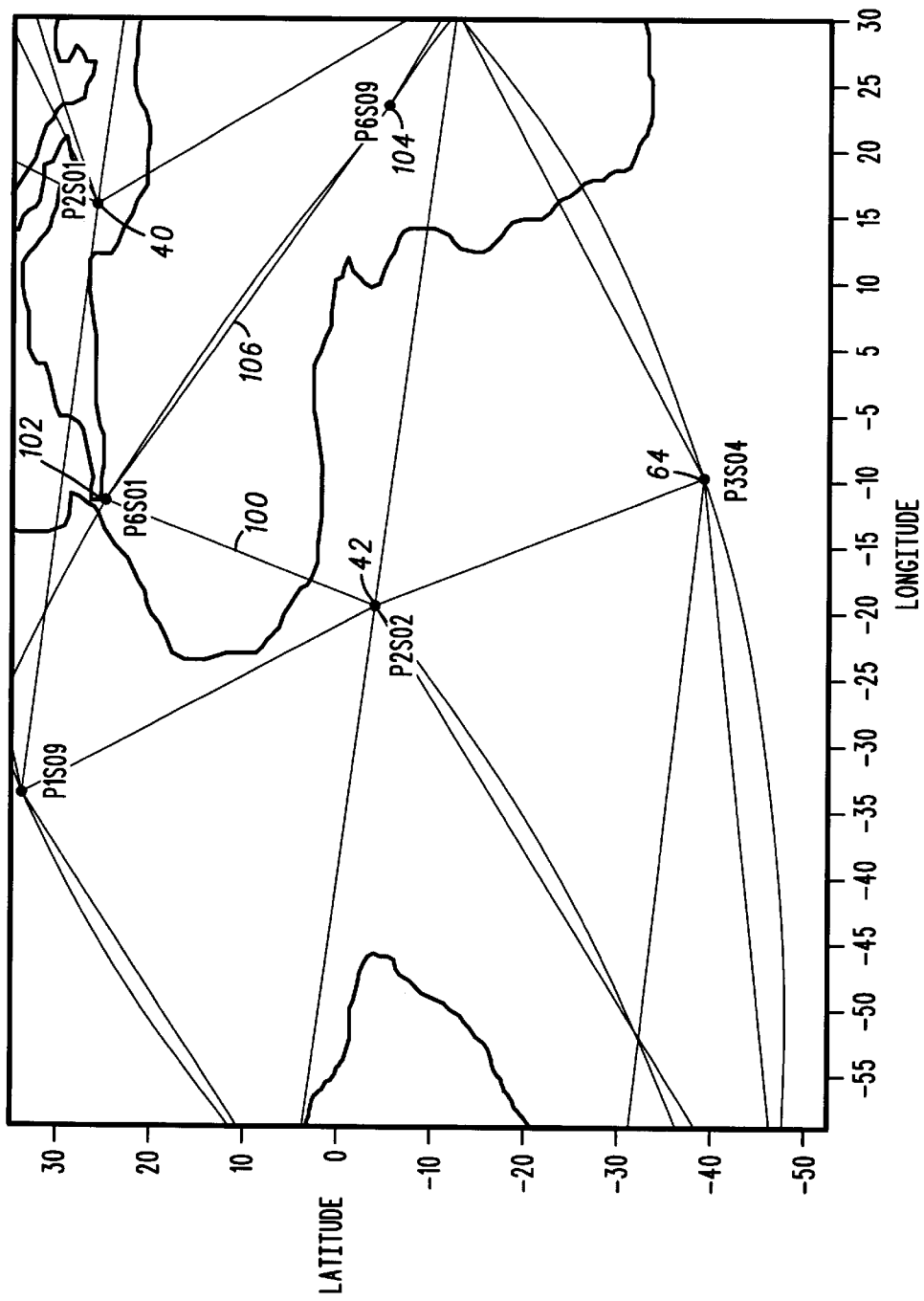

Referring now to FIG. 7, the dynamic link 100 between satellite 42 and 102 is established. As can be seen from FIG. 7, satellite 42 has previously disconnected its link with satellite 40 and has acquired a dynamic link with satellite 102 in a non-adjacent orbital plane and one moving in an opposite direction with respect to satellite 42. This dynamic link provides a communication link to a satellite that is four planes separated from the satellite plane of satellite 42. This allows for more efficient data transfer between satellite nodes of constellation 12 by allowing satellites in planes 2 and 6 to directly communicate with each other thereby avoiding the requirement of "hopping" the intended data/signal through certain intermediate satellites in planes 3–5.

Figure 8:
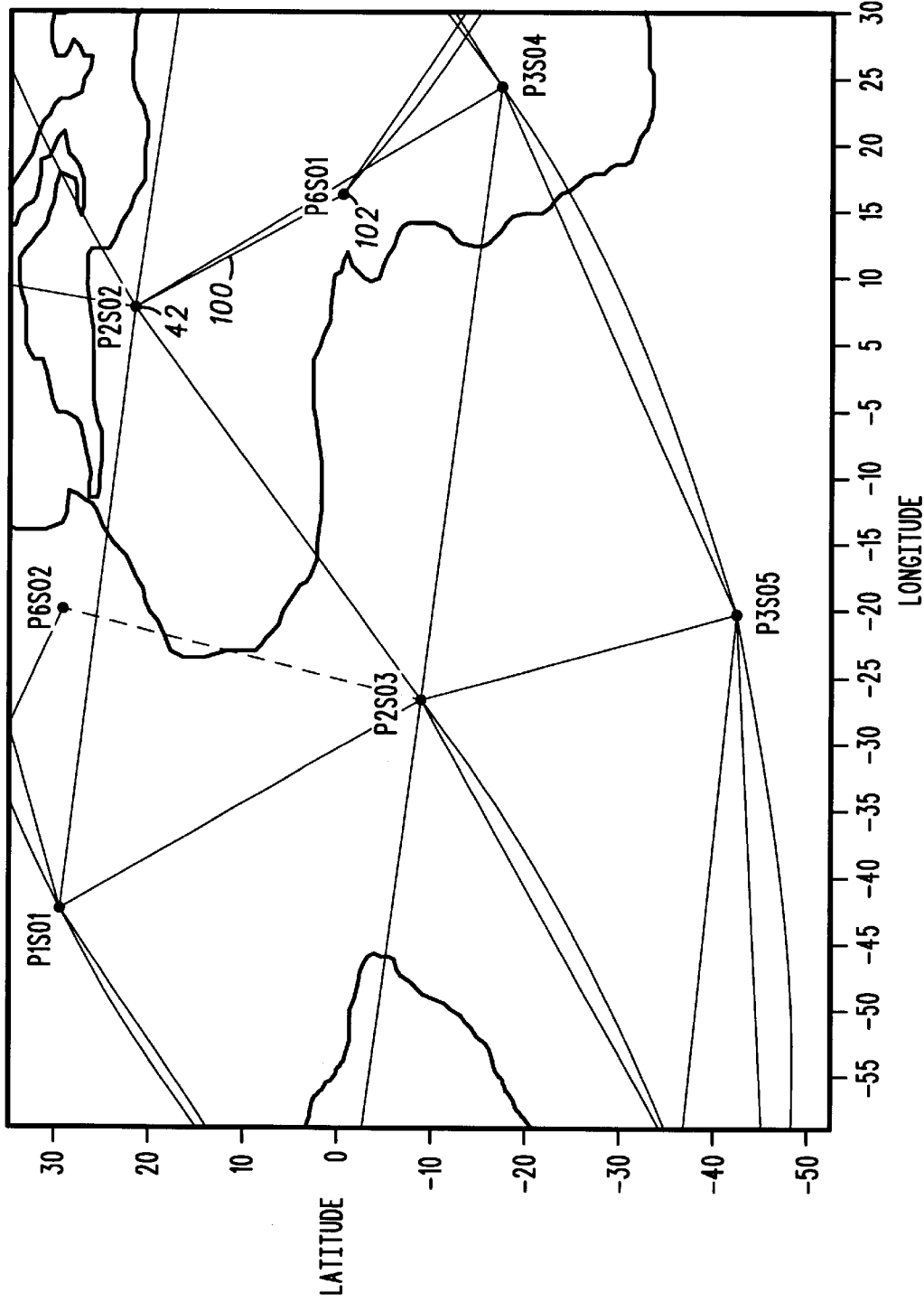

Referring now to FIG. 8, satellite 42 has continued to ascend in its orbit, while satellite 102 has continued to descend in its orbit such that satellites 42 and 102 are now moving in a direction farther away from each other. Accordingly, FIG. 8 represents cross-link 100 still being connected but approaching the end of the usable link time.

Figure 9:
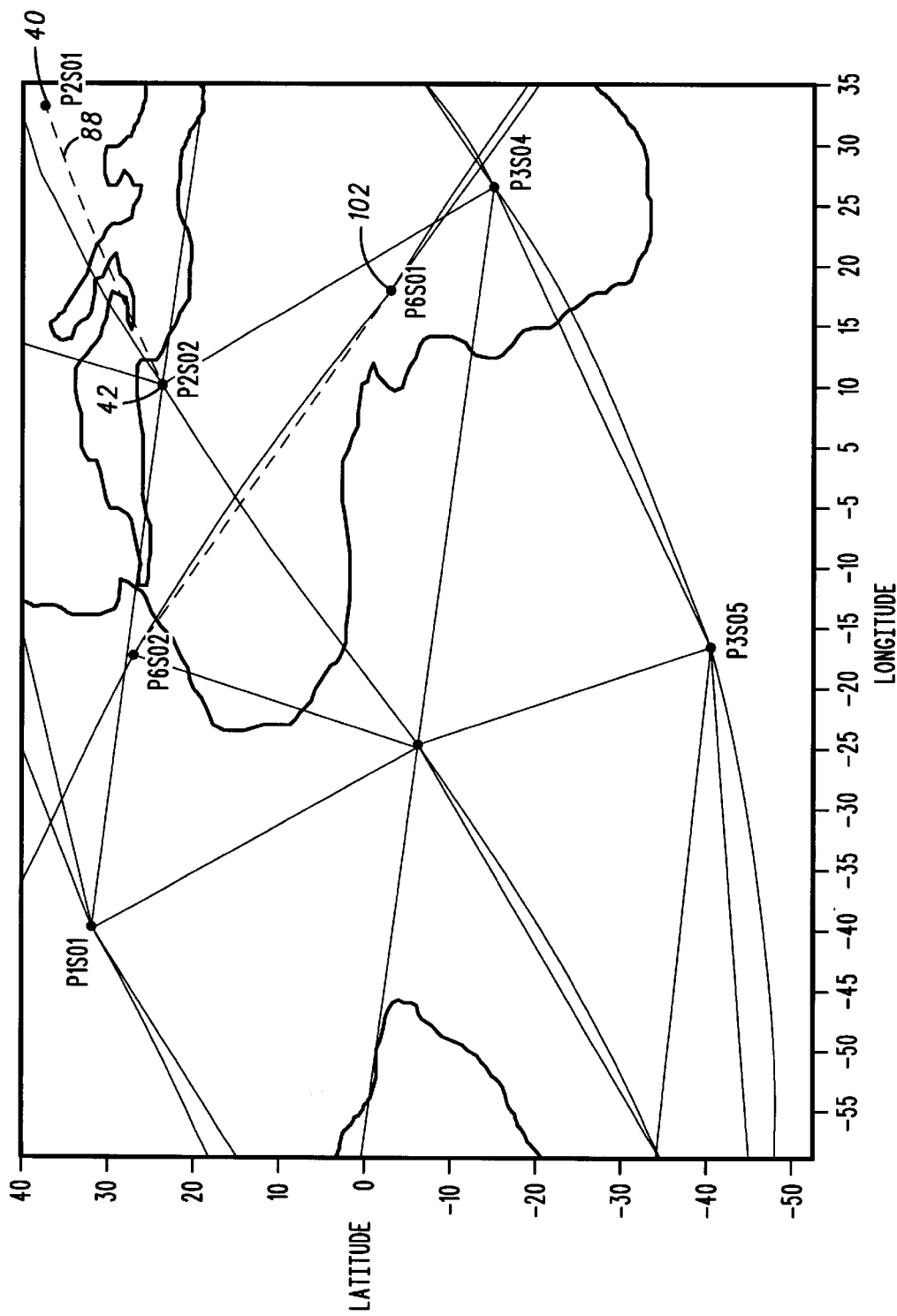

Jumping now to FIG. 9, the dynamic cross-link between satellites 42 and 102 is disconnected and the original static cross-link 88 between satellites 42 and 40 is beginning to be re-acquired as represented by the dotted lines for cross-link 88. Again, all other static cross-links with satellite 42 remain intact, as defined in Table 1.

Figure 10:
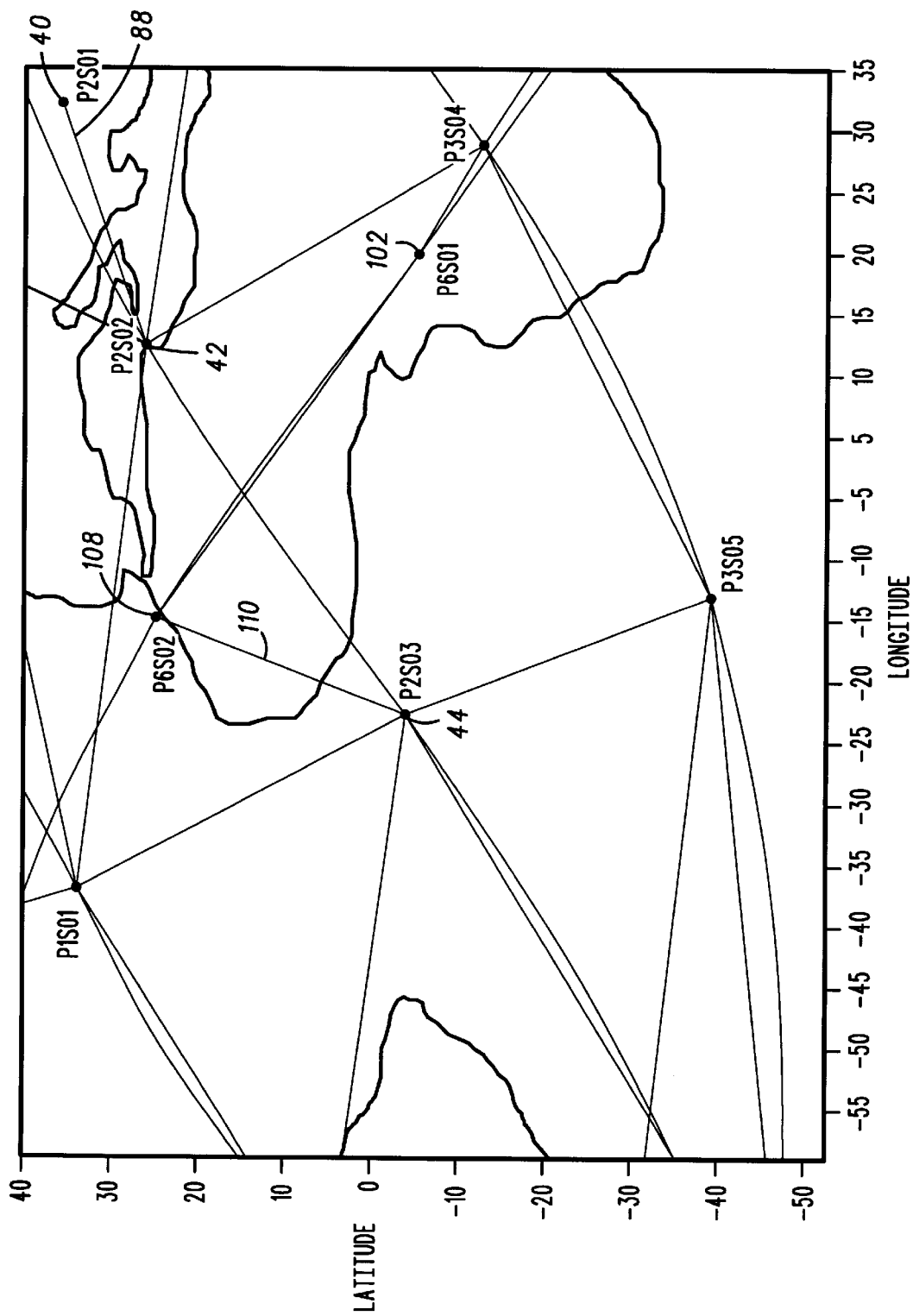

Finally, referring to FIG. 10, the static cross-link 88 between satellites 42 and 40 is re-established, while the dynamic link between satellites 42 and 102 is no longer in existence because satellites 42 and 102 are relatively distant from each and a feasible link is typically no longer possible between the two satellites.

Note, however, that FIG. 10 also illustrates that satellite 44 has established a dynamic cross-link 10 with satellite 108, which is also four orbital planes away from the orbital plane of satellite 44. The process of satellite 44 acquiring a dynamic link with satellite 108 is a similar process as was described for satellite 42 acquiring a dynamic link with satellite 102.

In the embodiment described herein, each satellite has two dynamic link partners, although more partners are certainly within the scope of the present invention. For a given satellite, the dynamic cross links are established based upon certain criteria such as the satellite's elevation or viewing angle to other satellites as well as the satellites range to other satellites. For example, one of the dynamic link partners may be established when the satellite is ascending and within a predetermined range of a desired partner satellite, and the other link may be established when the satellite is descending and within a predetermined range of another desired partner satellite.

Establishing the dynamic link when the given satellite is ascending proceeds as follows: when the given satellite is ascending, the range between the satellite and its descending dynamic link partner (defined by the table below) is monitored until the satellites are within a predetermined range, for example, 5,000 kilometers (km). The satellites may be monitoring this range, or the range monitoring may be performed in a different subsystem of a satellite communication system thereby reducing the intelligence required by each satellite. In the latter case, the satellite would need to be informed of when to establish and deactivate the dynamic links.

As soon as the dynamic link partner is within range, the static link is deactivated and the satellite's linking component begins to slew and acquire the dynamic partner wherein the linking component may be an RF antenna system, an optical terminal, or any other suitable communication system. It is understood that determining an acceptable slew and acquisition time is based on desired system performance and may be readily ascertained by one skilled in the art. In a preferred embodiment, the time is sixty (60) seconds. After the link acquisition is complete, the link is then updated to active mode and the satellites may then begin to transmit data across the link.

While the link is active, the range is monitored until the partners are once again out of a predetermined range, for example, 5,000 km, at which time the dynamic link is then deactivated. If a static link was being used to maintain the dynamic link, the static link partner is reacquired and returned to normal duty. Alternatively, the dynamic link may be deactivated as soon as the next ascending dynamic link in this plane is established, maintaining only one ascending dynamic link per plane.

Note that the exact same process is occurring on both ends of an acquiring dynamic link. That is, the link is occurring from the perspective of the ascending satellite and from the perspective of the descending satellite.

Referring now to Tables 4–6, the common dynamic partner scheme for each satellite is defined in a similar manner that the static partnering scheme was defined with respect to Tables 1–3. Recall that Table 1 defined the static partnering scheme for satellites in planes 2–6 (the non-seam planes), Table 2 defined the static partnering scheme for satellites in plane 1 (right-hand side of the seam), and Table 3 defined the static partnering scheme for satellites in plane 7 (left-hand side of the seam). Likewise, the dynamic partnering scheme is defined by three tables whereby the plane offset is what defines which planes are the seam. Accordingly, for the above-described seven plane satellite constellation, the scheme is described for satellites in planes 1–3, plane 4, and planes 5–7. Table 4 describes the dynamic partnering scheme for a satellite in planes 1–3, Table 5 describes the dynamic partnering scheme for a satellite in plane 4, and Table 5 describes the dynamic partnering scheme for a satellite in planes 5–7.

TABLE 4

Dynamic Partnering Scheme for the Mth satellite in planes 1–3.

| Ascending/ Descending | Acq/Slew Time | Range (km) | Shared Link (if any) | Plane | Satellite |
|---|---|---|---|---|---|
| Ascending | 60 sec | 5,000 km | Link 2 | P (n + 4) | S (m + 8) |
| Descending | 60 sec | 5,000 km | Link 1 | P (n + 3) | S (m + 6) |

TABLE 5

Dynamic Partnering Scheme for the Mth satellite in plane 4.

| Ascending/ Descending | Acq/Slew Time | Range (km) | Shared Link (if any) | Plane | Satellite |
|---|---|---|---|---|---|
| Ascending | 60 sec | 5,000 km | Link 2 | P (n + 4) | S (m + 3) (seam) |
| Descending | 60 sec | 5,000 km | Link 1 | P (n + 3) | S (m + 6) |

TABLE 6

Dynamic Partnering Scheme for the Mth satellite in planes 5–7.

| Ascending/ Descending | Acq/Slew Time | Range (km) | Shared Link (if any) | Plane | Satellite |
|---|---|---|---|---|---|
| Ascending | 60 sec | 5,000 km | Link 2 | P (n + 4) | S (m + 3) (seam) |
| Descending | 60 sec | 5,000 km | Link 1 | P (n + 3) | S (m + 1) (seam) |

Thus, the present invention has provided for the acquisition and establishment of a dynamic link between satellites in non-adjacent orbital planes that are moving in opposite directions such as one in an ascending direction and one in a descending direction. In general, the static partnering scheme for any given satellite is defined by Table 1–3. Further, the dynamic partnering scheme is defined by Tables 4–6. These partnering schemes are common to all satellites such that Tables 1–6 clearly and completely define the static and dynamic partnering scheme for any satellite in the constellation. Further, although a six-satellite partnering scheme has been described herein, it is understood that the present invention is applicable to any number of partners for a satellite in the constellation. What is of significance, however, is that a common partnering scheme exists for all satellites.

By now it should be understood that the present invention provides a novel method and apparatus for establishing a partnering scheme having dynamic cross-links between satellites of a satellite communication system that are travelling in different, non-adjacent orbital planes and in different directions. The present invention provides a definitive set of dynamic cross-links for a satellite positioned within a first orbital plane traveling in a first direction, such as an ascending direction, with a satellite positioned in a non-adjacent orbital plane and traveling in a second direction, such as an descending direction. This dynamic cross-link scheme allows for quicker and more efficient data and information transfer through the satellite constellation.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for defining a partnering scheme for each satellite of a satellite constellation, the satellite constellation having a first predetermined number of planes (NUMP) and a second predetermined number of satellites (NUMS) within each of said planes, the method comprising the steps of:

(a) cross-linking a first satellite in a first plane to at least one satellite in said first plane, wherein the identity of the at least one satellite in said first plane is determined according to a scheme based on constellation address nomenclature calculations;

(b) cross-linking said first satellite to at least one satellite in a second plane, said second plane being in a right adjacent plane with respect to said first plane wherein the identity of the at least one satellite in said second plane is determined according to a scheme based on constellation address nomenclature calculations;

(c) cross-linking said first satellite to at least one satellite in a third plane, said third plane being in a left adjacent plane with respect to said first plane, wherein the identity of the at least one satellite in said third plane is determined according to a scheme based on constellation address nomenclature calculations; and (d) further wherein said partnering scheme set forth in steps (a)–(c) for said first satellite in said first plane is common to all satellites in said satellite constellation.

2. The method of claim 1, further including the step of dynamically cross-linking said first satellite to at least one satellite in a fourth plane when said first satellite and said at least one satellite in the fourth plane are within a predetermined range from each other, said fourth plane being in a non-adjacent plane with respect to said first plane, and wherein said dynamic cross-link set forth for said first satellite is common to all satellites in said satellite constellation.

3. The method of claim 1, wherein the satellite (S) of ordinal "M" within the plane (P) of ordinal "N", as denoted by PNSM, is cross-linked with the following other satellites: PNS(M+1), PNS(M−1), P(N+1)S(M+1), P(N+1)S(M+2), P(N−1)S(M−1), and P(N−1)S(M+7), for satellites in all planes except the first and the last planes, wherein:

ordinal expressions for planes yielding values exceeding the fist predetermined number of planes are reduced by the first predetermined number of planes;

ordinal expressions for planes yielding negative values or the zero value are increased by NUMP;

ordinal expressions for satellites yielding values exceeding NUMS are reduced by NUMS; and ordinal expressions for satellites yielding negative values or the zero value are increased by NUMS.

4. The method of claim 3 wherein the satellite (S) of ordinal "M" within the plane (P) of ordinal "N", as denoted by PNSM, is cross-linked with the following other satellites: PNS(M+1), PNS(M−1), P(N+1)S(M+1), P(N+1)S(M+2), P(N−1)S(M+3), and P(N−1)S(M+4), for satellites in plane 1.

5. The method of claim 4 wherein the satellite (S) of ordinal "M" within the plane (P) of ordinal "N", as denoted by PNSM, is cross-linked with the following other satellites: PNS(M+1), PN(S(M−1), P(N+1)S(M+5), P(N+1)S(M+6), P(N−1)S(M−1), and P(N−1)S(M+7), for satellites in a last plane of said satellite constellation.

6. The method of claim 2 wherein said at least one satellite in said fourth plane is offset a third predetermined number of satellites with respect to said first satellite and in a plane that is offset a fourth predetermined number of planes from said first plane.

7. The method of claim 2 further including the step of disconnecting at least one cross-link associated with said first satellite set forth in steps (a)–(c) before establishing said dynamic cross-link with said at least one satellite in said fourth plane.

8. The method of claim 2 wherein the satellite (S) of ordinal "M" within a plane (P) of ordinal "N", wherein N is an integer in the range of 1–3, inclusive, said satellite denoted by PNSM, is dynamically cross-linked with satellite P(N+4)S(M+8) when said satellite PNSM is ascending and with satellite P(N+3)S(M+6) when said satellite PNSM is descending, further wherein:

ordinal expressions for planes yielding values exceeding the first predetermined number of planes are reduced by the first predetermined number of planes;

ordinal expressions for planes yielding negative values or the zero value are increased by NUMP;

ordinal expressions for satellites yielding values exceeding NUMS are reduced by NUMS; and ordinal expressions for satellites yielding negative values or the zero value are increased by NUMS.

9. The method of claim 8 wherein the satellite (S) of ordinal "M" within a plane (P) of ordinal "N", wherein N equals 4, as denoted by PNSM, is dynamically cross-linked with satellite P(N+4)S(M+3) when said satellite PNSM is ascending, and with satellite P(N+3)S(M+6) when said satellite PNSM is descending.

10. The method of claim 9 wherein the satellite (S) of ordinal "M" within a plane (P) of ordinal "N", wherein N is an integer in the range of 4–7, inclusive, as denoted by PNSM, is dynamically cross-linked with satellite P(N+4)S(M+3) when said satellite PNSM is ascending and with satellite P(N+3)S(M+1) when said satellite PNSM is descending.

11. The method of claim 7 further including the steps of:

disconnecting said dynamic cross-link between said first satellite and said at least one satellite in said fourth plane when said first satellite and said at least one satellite in said is fourth plane are outside a predetermined range from each other; and reestablishing said at least one cross-link set forth in steps (a)–(c) that was previously disconnected.

12. A method for defining a dynamic cross-link partnering scheme for satellites in a satellite constellation having a first predetermined number of planes and a second predetermined number of satellites within each of said planes, the dynamic partnering scheme comprising:

disconnecting a cross-link between a first satellite in a first plane and a second satellite in a second plane wherein the identity of the second satellite in the second plane is determined according to a formula based on constellation address nomenclature; and establishing a dynamic cross-link between said first satellite in said first plane with a third satellite in a third plane when said first and third satellites are within a predetermined range from each other, said first and third satellites moving in opposite directions with respect to each other and said third plane being in a non-adjacent plane with respect to said first plane wherein the identity of the third satellite in the third plane is determined according to a formula based on constellation address nomenclature calculations, and further wherein said dynamic cross-link partnering scheme set forth is common to all satellites in said satellite constellation.

13. The method of claim 12 wherein said third satellite is offset a third predetermined number of satellites with respect to said first satellite and in a plane that is offset a fourth predetermined number of planes from said first plane.

14. The method of claim 12 further including the steps of:

disconnecting said cross-link between said first and third satellites when said first and third satellites are outside a predetermined range from each other; and re-establishing said one cross-link between said first and second satellites that was previously disconnected.

15. The method of claim 12 wherein the satellite (S) of ordinal "M" within a plane (P) of ordinal "N", wherein N is an integer in the range of 1–3, inclusive, as denoted by PNSM, is dynamically cross-linked with satellite P(N+4)S(M+8) when said satellite PNSM is ascending and with satellite P(N+3)S(M+6) when said satellite PNSM is descending, further wherein:

ordinal expressions for planes yielding values exceeding the first predetermined number of planes are reduced by the first predetermined number of planes;

ordinal expressions for planes yielding negative values or the zero value are increased by NUMP;

ordinal expressions for satellites yielding values exceeding NUMS are reduced by NUMS; and ordinal expressions for satellites yielding negative values or the zero value are increased by NUMS.

16. The method of claim 15 wherein the satellite (S) of ordinal "M" within a plane (P) of ordinal "N", as denoted by PNSM, wherein N equals 4, is dynamically cross-linked with satellite P(N+4)S(M+3) when said satellite PNSM is ascending and with satellite P(N+3)S(M+6) when said satellite PNSM is descending.

17. The method of claim 16 wherein the satellite (S) of ordinal "M" within a plane (P) of ordinal "N", wherein N is an integer in the range of 4–7, inclusive as denoted by PNSM, is dynamically cross-linked with satellite P(N+4)S(M+3) when said satellite PNSM is ascending and with satellite P(N+3)S(M+1) when said satellite PNSM is descending.

18. A method for establishing a common partnering scheme for satellites of a satellite constellation, the satellite constellation having a first predetermined number of planes and a second predetermined number of satellites within each of said planes, the method comprising the steps of:

establishing cross-links for a first satellite of a first plane to at least two other satellites in said satellite constellation wherein said cross-links between said first satellite and said at least two other satellites define a static cross-link portion of a predetermined partnering scheme for said first satellite of said first plane; and establishing cross-links for all other satellites in said constellation according to a dynamic cross-link,portion of said predetermined partnering scheme, wherein said predetermined partnering scheme comprises a set of formulas based on constellation address nomenclature calculations.

19. The method of claim 18 wherein said step of establishing cross-links for said first satellite includes the substeps of:

establishing a cross-link between said first satellite in said first plane and at least one satellite in said first plane;

establishing a cross-link between said first satellite in said first plane and at least one satellite in a second plane, said second plane being in a right adjacent plane with respect to said first plane; and establishing a cross-link between said first satellite in said first plane and at least one satellite in a third plane, said third plane being in a left adjacent plane with respect to said first plane.

20. The method of claim 18 further including the step of:

establishing a dynamic cross-link between said first satellite of said first plane and at least one other satellite in said satellite constellation when said first satellite and said at least one other satellite are within a predetermined range from each other, wherein said at least one other satellite is in a non-adjacent plane with respect to said first plane.

21. The method of claim 20 wherein said dynamic cross-link scheme for said first satellite of said first plane is common to all satellites in said satellite constellation.

22. The method of claim 20 further including the step of disconnecting at least one cross-link associated with said first satellite of said first plane before establishing a dynamic cross-link with said at least one other satellite in said satellite constellation.

* * * * *